(12) United States Patent
De Hoog et al.

(10) Patent No.: US 10,922,532 B2
(45) Date of Patent: Feb. 16, 2021

(54) INTERACTIVE SEATING SYSTEM AND METHOD FOR INTERACTING WITH A CROWD

(71) Applicant: INTERNATIONAL BUSINESS MACHINES CORPORATION, Armonk, NY (US)

(72) Inventors: Julian De Hoog, Greensborough (AU); Josh Andres, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 15/819,020

(22) Filed: Nov. 21, 2017

(65) Prior Publication Data

US 2019/0156110 A1 May 23, 2019

(51) Int. Cl.
| | |
|---|---|
| *G06K 9/00* | (2006.01) |
| *G06F 3/14* | (2006.01) |
| *G06Q 30/02* | (2012.01) |
| *G06K 9/66* | (2006.01) |
| *G06F 3/147* | (2006.01) |

(52) U.S. Cl.
CPC ........... *G06K 9/00302* (2013.01); *G06F 3/14* (2013.01); *G06F 3/147* (2013.01); *G06K 9/00255* (2013.01); *G06K 9/66* (2013.01); *G06Q 30/0201* (2013.01)

(58) Field of Classification Search
CPC .. G06K 9/00302; G06K 9/00255; G06K 9/66; G06F 3/14; G06Q 30/0201
See application file for complete search history.

(56) References Cited

U.S. PATENT DOCUMENTS

| 5,993,314 A | 11/1999 | Dannenberg et al. |
| 2009/0132925 A1* | 5/2009 | Koehler ................. G09B 5/06 715/730 |
| 2013/0320885 A1 | 12/2013 | Griebel |

(Continued)

OTHER PUBLICATIONS

Hennick, Calvin, "Stadiums Boost Wi-Fi, Apps to Improve the Fan Experience—and Revenue", Mar. 14, 2016, htpps://biztechmagazine.com/article/2016/03/stadiums-boost-wi-fi-apps-improve-fan-experience-and-revenue.

(Continued)

*Primary Examiner* — John W Lee
(74) *Attorney, Agent, or Firm* — F. Chau & Associates, LLC

(57) ABSTRACT

An interactive seating system includes first seats in a first section, a first sensor device, second seats in a second section, a second sensor device, a first processing unit, a second processing unit, and an output device. The first sensor device and the second sensor device observe the first seats and the second seats, respectively. The first processing unit receives data from the first sensor device and the second sensor device and interprets an emotional state of occupants in the first and second seats based on the received data from the first and second sensor device, respectively. The second processing unit receives the interpreted emotional states, and compares the interpreted emotional states between the first and second sections. The output device automatically produces an output, that is observable by the occupants, based on the comparison.

13 Claims, 8 Drawing Sheets

(56) References Cited

U.S. PATENT DOCUMENTS

| | | | |
|---|---|---|---|
| 2014/0013228 A1* | 1/2014 | Hutten | G06F 16/437 |
| | | | 715/720 |
| 2014/0068681 A1* | 3/2014 | Lemmey | H04L 12/1822 |
| | | | 725/74 |
| 2014/0100006 A1 | 4/2014 | Jennings | |
| 2016/0170996 A1* | 6/2016 | Frank | G06F 16/24578 |
| | | | 707/748 |
| 2017/0032630 A1 | 2/2017 | Gervais et al. | |

OTHER PUBLICATIONS

Maddox, Teena, "Stadiums race to digitize: How sports teams are scrambling to keep Millennials coming to games", Apr. 25, 2014, https://www.techrepublic.com/article/how-sports-teams-are-scrambling-to-keep-millennials-coming-to-games/.

Martinelli, Marissa, "How Do the Light-Up Bracelets on Taylor Swift's 1989 Tour Actually Work?", Jul. 17, 2015, http://www.slate.com/blogs/browbeat/2015/07/17/pixmob_the_company_behind_the_led_bracelets_on_taylor_swift_s_1989_tour.html.

Paradis, Matthew, et al., "VenueExplorer, Object-Based Interactive Audio for Live Events", Jan. 26-27, 2015, WAC'15, Paris. France.

Maynes-Aminzade, Dan, et al., "Techniques for Interactive Audience Participation". Oct. 16, 2002, Proceedings Fourth IEE International Conferencde on Multimodal Interfaces, Pittsburgh, PA, pp. 1-6.

\* cited by examiner

INTERACTIVE SEATING SYSTEM AND METHOD FOR INTERACTING WITH A CROWD

TECHNICAL FIELD

Exemplary embodiments of the inventive concept relate to a system and method for an interactive stadium experience during live spectator events, and more particularly, to an interactive seating system and a method for interacting with a crowd.

DISCUSSION OF RELATED ART

Due to competition from home viewing of live events due to increased quality of broadcasts and high-definition televisions, venues like stadiums and arenas are increasingly providing upgraded technology to enhance the experience of attendees. For example, wireless connectivity throughout a venue taps into the ubiquity of mobile devices and serves as a vehicle for collecting data to provide targeted advertising and increase engagement. As another example, some venues provide bracelets that light up during a show in response to remotely controlled radio-frequency identification (RFID) and infrared signals. However, existing systems do not react directly with crowd behavior and provide interactivity through the venue itself. Accordingly, to increase attendance, boost revenues, and address changing demographics, venues seek ways to improve the experience of attending a live event.

SUMMARY

According to an exemplary embodiment of the inventive concept, an interactive seating system may include a first plurality of seats, a first sensor device, a second plurality of seats, a second sensor device, a first processing unit, a second processing unit, and an output device. The first plurality of seats may be disposed within a first section of a venue. The first sensor device may be directed towards the first section and configured to observe each of the first plurality of seats. The second plurality of seats may be disposed within a second section of the venue. The second sensor device may be directed towards the second section and configured to observe each of the second plurality of seats. The first processing unit may be configured to receive data from the first sensor device and the second sensor device and to interpret an emotional state of each of a first plurality of occupants of the first plurality of seats and each of a second plurality of occupants of the second plurality of seats based on the received data from the first sensor device and the second sensor device, respectively. The second processing unit may be configured to receive the interpreted emotional state of each of the first plurality of occupants, to receive the interpreted emotional state of each of the second plurality of occupants, and to compare the interpreted emotional state of each of the first plurality of occupants with the emotional state of each of the second plurality of occupants. The output device may be configured to automatically produce an output, that is observable by each of the first plurality of occupants and each of the second plurality of occupants, based on the comparison of the interpreted emotional state of each of the first plurality of occupants with the emotional state of each of the second plurality of occupants.

According to an exemplary embodiment of the inventive concept, an interactive seating system may include a first plurality of seats, a first sensor device, a second plurality of seats, a second sensor device, a third plurality of seats, a third sensor device, first through fifth processing units, and an output device. The first plurality of seats may be disposed within a first section of a venue. The first sensor device may be directed towards the first section and configured to observe each of a first plurality of occupants of the first plurality of seats. The second plurality of seats may be disposed within a second section of the venue. The second sensor device may be directed towards the second section and configured to observe each of a second plurality of occupants of the second plurality of seats. The third plurality of seats may be disposed within a third section of the venue, where the first, second, and third sections of the venue are non-overlapping. The third sensor device may be directed towards the third section and configured to observe each of a third plurality of occupants of the third plurality of seats. The first processing unit may be configured to receive data from the first sensor device, the second sensor device, and the third sensor device and to interpret an emotional state of each of the first plurality of occupants, each of the second plurality of occupants, and each of the third plurality of occupants, based on the received data from the first sensor device, the second sensor device, and the third sensor device, respectively. The second processing unit may be configured to score the emotional state of the first plurality of occupants based on the interpreted emotional state of each of the first plurality of occupants, the interpreted emotional state of each of the second plurality of occupants weighted according to a distance between the first section and the second section, and the interpreted emotional state of the third plurality of occupants weighted according to a distance between the first section and the third section. The third processing unit may be configured to score the emotional state of the second plurality of occupants based on the interpreted emotional state of each of the second plurality of occupants, the interpreted emotional state of each of the first plurality of occupants weighted according to a distance between the second section and the first section, and the interpreted emotional state of the third plurality of occupants weighted according to a distance between the second section and the third section. The fourth processing unit may be configured to score the emotional state of the third plurality of occupants based on the interpreted emotional state of each of the third plurality of occupants, the interpreted emotional state of each of the first plurality of occupants weighted according to a distance between the third section and the first section, and the interpreted emotional state of the second plurality of occupants weighted according to a distance between the third section and the second section. The fifth processing unit may be configured to receive the scored emotional state of the first plurality of occupants, to receive the scored emotional state of the second plurality of occupants, to receive the scored emotional state of the third plurality of occupants, and to compare the scored emotional state of the first plurality of occupants with the scored emotional state of the second plurality of occupants and the scored emotional state of the third plurality of occupants. The output device may be configured to automatically produce an output, that is observable by each of the first plurality of occupants, each of the second plurality of occupants, or each of the third plurality of occupants, based on the comparison of the scored emotional state of the first plurality of occupants with the scored emotional state of the second plurality of occupants and the scored emotional state of the third plurality of occupants.

According to an exemplary embodiment of the inventive concept, a method for interacting with a crowd may include receiving first video data of a first plurality of occupants of a first plurality of seats disposed within a first section of a venue, interpreting an emotional state of each of the first plurality of occupants, receiving second video data of a second plurality of occupants of a second plurality of seats disposed within a second section of a venue, interpreting an emotional state of each of the second plurality of occupants, and receiving third video data of a third plurality of occupants of a third plurality of seats disposed within a third section of a venue, interpreting an emotional state of each of the third plurality of occupants. The first section may be scored based on the interpreted emotional state of each of the first plurality of occupants, the interpreted emotional state of each of the second plurality of occupants weighted according to a distance between the first section and the second section, and the interpreted emotional state of each of the third plurality of occupants weighted according to a distance between the first section and the third section. The second section may be scored based on the interpreted emotional state of each of the second plurality of occupants, the interpreted emotional state of each of the first plurality of occupants weighted according to a distance between the second section and the first section, and the interpreted emotional state of each of the third plurality of occupants weighted according to a distance between the second section and the third section. The third section may be scored based on the interpreted emotional state of each of the third plurality of occupants, the interpreted emotional state of each of the first plurality of occupants weighted according to a distance between the third section and the first section, and the interpreted emotional state of each of the second plurality of occupants weighted according to a distance between the second section and the third section. The scores of the first section, the second section, and the third section may be compared. An output, observable to each of the first plurality of occupants, each of the second plurality of occupants, or each of the third plurality of occupants, may be provided based on the comparing of the scores of the first section, the second section, and the third section.

BRIEF DESCRIPTION OF THE DRAWINGS

The above and other features of the inventive concept will become more apparent by describing in detail exemplary embodiments thereof, with reference to the attached drawings.

DETAILED DESCRIPTION OF THE EMBODIMENTS

Figure 1:
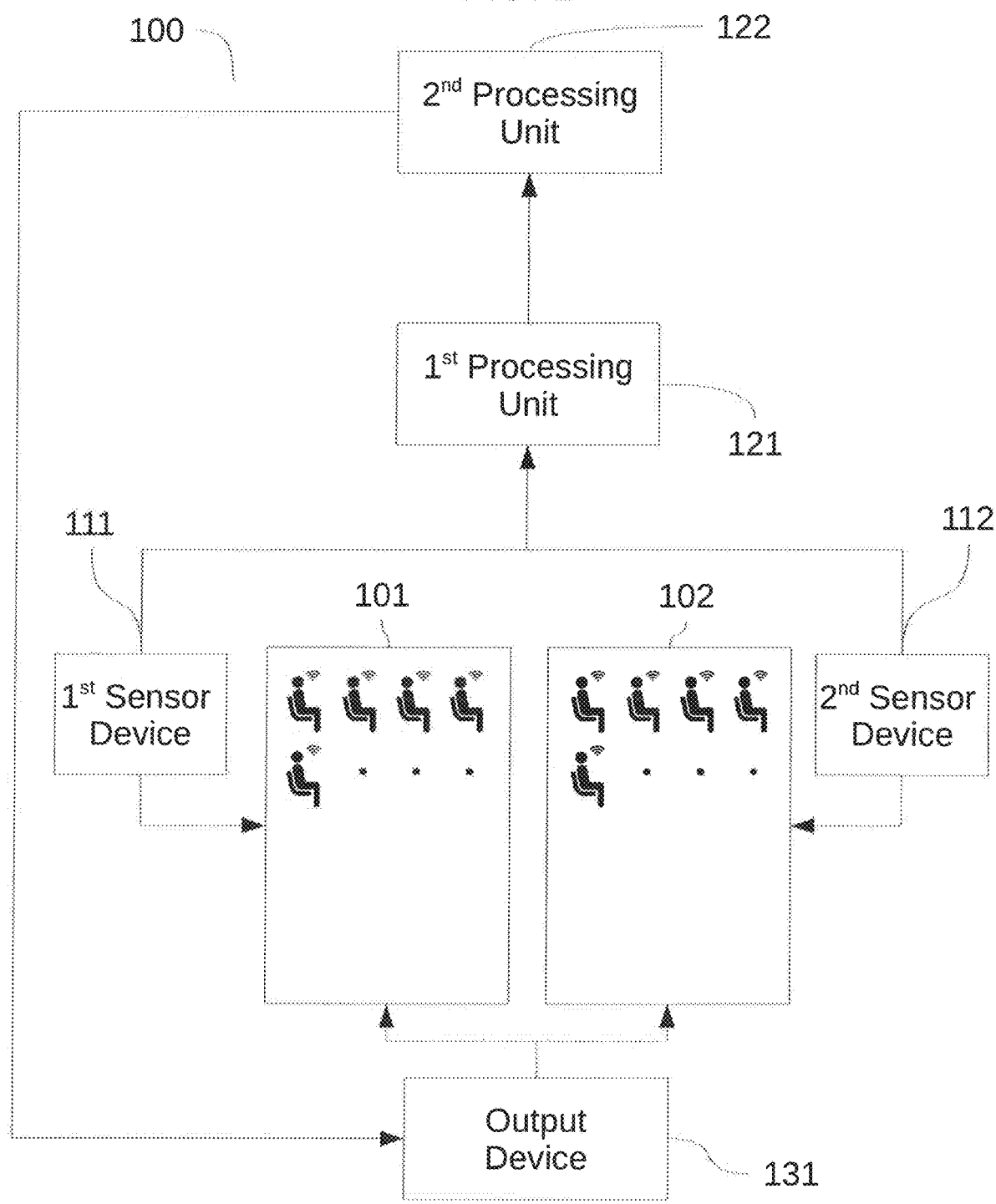
FIG. 1 illustrates an interactive seating system according to an exemplary embodiment of the inventive concept.

Exemplary embodiments of the inventive concept provide an interactive seating system and method for interacting with a crowd to ameliorate and accentuate audience behavior during a live event by gauging crowd sentiment and automatically activating different actuators for a more immersive experience.

Exemplary embodiments of the inventive concept will be described more fully hereinafter with reference to the accompanying drawings. Like reference numerals may refer to like elements throughout the specification and drawings.

FIG. 1 illustrates an interactive seating system according to an exemplary embodiment of the inventive concept.

An interactive seating system 100 may include a first plurality of seats 101, a first sensor device 111, a second plurality of seats 102, a second sensor device 112, a first processing unit 121, a second processing unit 122, and an output device 131.

The first plurality of seats 101 may be disposed within a first section of a venue. The second plurality of seats 102 may be disposed within a second section of the venue. The venue may be an arena, a theatre, a stadium, a concert hall, etc.

The first sensor device 111 may be directed towards the first section and configured to observe each of the first plurality of seats 101 in the first section. The second sensor device 112 may be directed towards the second section and configured to observe each of the second plurality of seats in the second section. Each of the first sensor device 111 and the second sensor device 112 may include at least one of a video camera, an infrared camera, a 3D camera, a depth-sensing camera, a laser range finder, a carbon dioxide sensor, a microphone, a pressure sensor, a photographic camera, an olfaction device, etc.

For example, the first sensor device 111 may include a first video camera pointed towards the first section and the second sensor device 112 may include a second video camera pointed towards the second section. The first and second video cameras may capture video of occupants at the first plurality of seats 101 and the second plurality of seats 102. The first and second video cameras may also be configured to capture still images of occupants at predetermined intervals. Alternatively, a photographic camera may be separately provided to capture still images, e.g., photographs, of occupants. Computer vision interpretation may be performed on the images, which will be described below.

For example, an infrared camera may capture image(s) of occupants using infrared radiation, and the infrared imagery may be used for temperature measurement. A 3D camera, depth-sensing camera, or laser range finder may be used to build a 3-dimensional understanding of the occupants, including their number and movement. A carbon dioxide sensor, such as an infrared gas sensor or chemical gas sensor, may be used to measure the amount of carbon dioxide gas. A microphone may be used to record sounds produced by the occupants. A pressure sensor may be included in the first plurality of seats 101 and the second plurality of seats 102 and/or the floor besides the first plurality of seats 101 and the second plurality of seats 102 to measure pressure. An olfaction device, such as conductive-polymer odor sensors (polypyrrole), tin-oxide gas sensors, and quartz-crystal micro-balance sensors, may be used to detect odors through pattern analysis.

Accordingly, through the first sensor device 111 and the second sensor device 112, the "environment" of the first section and the second section, e.g., the actions/reactions of the occupants, may be measured. The first sensor device 111 and the second sensor device 112 may be configured to take measurements at predetermined intervals.

According to an exemplary embodiment of the inventive concept, the first sensor device 111 includes a first sensor disposed within each of the first plurality of seats 101 disposed within the first section of the venue and the second sensor device 112 includes a second sensor disposed within each of the second plurality of seats 102 disposed within the second section of the venue. According to an exemplary embodiment of the inventive concept, the first sensor device 111 and the second sensor device 112 may include sensors disposed within each of the first plurality of seats 101 and/or each of the second plurality of seats 102, respectively, e.g., pressure sensors, as well as disposed away from each of the first plurality of seats 101 and/or the second plurality of seats 102, e.g., video cameras. In other words, configurations of the first sensor device 111 and the second sensor device 112 with respect to the first plurality of seats 101 and the second plurality of seats 102 may vary.

For example, when the first sensor device 111 includes the first sensor disposed within each of the first plurality of seats 101, the first sensor may include a pressure sensor, a temperature sensor, a carbon dioxide sensor, and/or a microphone, which are described above. By disposing the first sensor in relatively close proximity to the occupants in each seat, data captured with respect to the occupants may be more accurate. For example, each seat may include a pressure sensor to detect whether the seat is occupied, or more precisely, whether the occupant is firmly or lightly seated. The second sensor device 112 may have a similar configuration as the first sensor device 111.

According to an exemplary embodiment of the inventive concept, the first sensor device 111 may be disposed within a first plurality of wearable computers worn by the first plurality of occupants of the first plurality of seats 101 and the second sensor device 112 may be disposed within a second plurality of wearable computers worn by the second plurality of occupants of the second plurality of seats 102. For example, each occupant may be provided a reusable or disposable wearable device that includes a plurality of sensors, such as a heart rate or pulse monitor, temperature sensor, carbon dioxide sensor, microphone, motion or kinetic sensor, etc. Hereinafter, descriptions of sensors already described will be omitted.

For example, the wearable computers may be worn on the wrists of the first plurality of occupants and the second plurality of occupants. A heart rate monitor may use, for example, photoplethysmography to measure the pulse of a wearer. A motion sensor, such as an accelerometer, may detect movement of the wearer.

According to an exemplary embodiment of the inventive concept, the first sensor device 111 and the second sensor device 112 may include wireless communication functionality, e.g., through Bluetooth, Wi-Fi, NFC, infrared, ZigBee, RFID, etc. As such, the first sensor device 111 and the second sensor device 112 may transmit signals, e.g., sensed or measured data, to other units for processing, which will be described below. Furthermore, when the first sensor device 111 and the second sensor device 112 are disposed within wearable computers, locations of the wearable computers may be determined through wireless communication, e.g., a Wi-Fi positioning system. Location data may also be transmitted from the first sensor device 111 and the second sensor device 112.

According to an exemplary embodiment of the inventive concept, data captured by the first sensor device 111 and the second sensor device 112 may be transmitted to a local or cloud-based server for storage and/or processing. A cloud computing environment will be described below with reference to FIGS. 6 and 7.

The first processing unit 121 may be configured to receive data from the first sensor device 111 and the second sensor device 112 and to interpret an emotional state of each of a first plurality of occupants of the first plurality of seats 101 and each of a second plurality of occupants of the second plurality of seats 102 based on the received data from the first sensor device 111 and the second sensor device 112, respectively.

According to an exemplary embodiment of the inventive concept, the first processing unit 121 may be a computer system running software for computer vision interpretation in which one or more faces are recognized within of each of the first plurality of occupants of the first plurality of seats 101 and each of the second plurality of occupants of the second plurality of seats 102, e.g., by analyzing still images or photographs captured by a camera included in the first sensor device 111 and the second sensor device 112. For example, faces may be recognized by extracting facial features from the image. Each of the one or more faces may be indexed to an atlas of facial expressions that is correlated to known emotional states, e.g., happiness, anger, surprise, sadness, etc.

According to an exemplary embodiment of the inventive concept, the first processing unit 121 may be a computer system running software for computer vision interpretation in which the data from the first sensor device 111 and the data from second sensor device 121 are interpreted using a trained classifier. The classifier may be trained, through machine learning or a neural network, using video data that has been annotated for emotional states, e.g., happiness, anger, surprise, sadness, etc. For example, to train the classifier, a first image of a happy face, a second image of a happy face, and a third image of an angry face may be loaded. A plurality of measurements are taken for each of the first through third images and the neural network may be adjusted as needed such that measurements for the first and second images for happy faces are closer as compared to those of the third image for the angry face. This training process may be repeated for different emotional states. Accordingly, different emotional states of the first plurality of occupants and the second plurality of occupants may be interpreted from video data.

According to an exemplary embodiment of the inventive concept, the first processing unit 121 may be a computer system running software for performing computer vision interpretation of personal dynamics of the data from the first sensor device 111 and the data from second sensor device 121. Personal dynamics may include, for example, movements and gestures of the occupants. Motion detection may be applied to video data from the first sensor device 111 and the second sensor device 112 to detect movement of individual occupants as well as general movement trends across an entire section, e.g., numerous people leaving or entering. By analyzing video data over time, occupancy of a section may also be determined. This may be performed, for example, through background subtraction techniques.

Apart from computer vision interpretation, additional processing by the first processing unit 121 may be performed on data from different sensors to interpret emotional states and gather further information about the occupants. For example, an infrared camera may capture temperature information based on heat radiating from a person's skin and the temperature information may indicate different emotional states. Relatively high temperatures throughout the body may indicate happiness, relatively high temperatures in mainly the upper body may indicate anger, and relatively low temperatures throughout the body may indicate sadness. When a person is in motion, e.g., due to anger or joy, body temperature may tend to rise. On the other hand, if a person is bored at the venue or is disappointed due to events at the venue, they may tend to stay seated and move less, resulting in lower body temperatures.

3D cameras, depth-sensing cameras, or laser range finders may be used to build a 3-dimensional understanding of the occupants, including how many of them are present, where they are, whether they are moving, and how fast and often they are moving. The first processing unit 121 may use this data to determine the amount of physical activity (which may be mapped to an emotional state such as boredom or excitement) and the arrival or departure of occupants.

Through sound recordings captured by a microphone, greater emotional response may be inferred when there is significant noise, and vice versa. Speech or voice recognition may be also used to analyze sound data. For example, the first processing unit 121 may recognize when a crowd is chanting a team's name.

Pressure sensors, included in the seats and/or floors, may detect pressure changes. Thus, the first processing unit 121 may analyze the pressure data to determine when a large number of people are getting up from their seats (e.g., due to excitement, to buy refreshments, etc.) or walking around (e.g., leaving or returning to their seats). Additionally, the first processing unit 121 may determine whether an occupant is firmly or lightly seated (e.g., lightly sitting on the edge of the seat may indicate anxiety or excitement).

The first processing unit 121 may further analyze data captured by other sensors. For example, olfaction devices may be configured to detect particular pheromones, which may indicate that the occupants are sweating due to an emotional response. Carbon dioxide sensors may detect an increase in carbon dioxide, which may be produced by rapid breathing due to excitement or nervousness. Similarly, an increase in heart rate detected by heart rate monitors may also indicate the same. Motion sensors in wearable computers may achieve a purpose similar to that of motion detection analysis performed on video data. For instance, when occupants are gesticulating wildly, high-fiving, dancing, etc., a relevant emotional state may be interpreted.

As described above, the first sensor device 111 and the second sensor device 112 may include different sensors. Interpreting an emotional state of the first plurality of occupants and the second plurality of occupants may be inaccurate when relying on data from one or a few sensors. Thus, according to an exemplary embodiment of the inventive concept, sensor data may be analyzed by the first processing unit 121 in aggregate to interpret the emotional state. For example, video data may indicate that occupants are moving around. Temperature data may indicate an increase in temperature of the occupants. Sound recordings may indicate cheering or celebration. In other words, the emotional state may be interpreted as happiness, and may be further corroborated by other sensors such as the carbon dioxide sensors or heart rate monitors. Data from different sensors may be assigned different weights, e.g., according to accuracy, when interpreting the emotional state of the occupants.

According to exemplary embodiments of the inventive concept, the first processing unit 121 may be disposed in each of the first plurality of seats 101 and the second plurality of seats 102 to receive and process information about an occupant in a given seat. According to exemplary embodiments of the inventive concept, the first processing unit 121 may be a centralized processing unit for analyzing data for an entire section. According to exemplary embodiments of the inventive concept, the first processing unit 121 may include both a centralized processing unit and seat-based processing units, as needed.

The second processing unit 122 may be configured to receive the interpreted emotional state of each of the first plurality of occupants from the first processing unit 121, to receive the interpreted emotional state of each of the second plurality of occupants from the first processing unit 121, and to compare the interpreted emotional state of each of the first plurality of occupants with the emotional state of each of the second plurality of occupants.

According to an exemplary embodiment of the inventive concept, the second processing unit 122 may be configured to additionally compare degree of activity, degree of change in emotional state, and/or degree of change in activity between the first plurality of seats 101 and the second plurality of seats 102. First, a comparison of degree of activity may compare how much the first plurality of occupants is moving as compared to the second plurality of occupants. Second, a comparison of degree of change in emotional state may be performed over time. For example, the first plurality of occupants may have frequently fluctuating emotional states, which may imply that they are engaged and fully participating in the event. On the other hand, the second plurality of occupants may have relatively little change in emotional state, e.g., due to lack of interest or constant disappointment. Third, and similarly, a comparison of degree of change in activity may show, for example, that the second plurality of occupants is more frequently in motion, e.g., leaving and returning their seats, which may also indicate a lack of engagement.

The output device 131 may be configured to automatically produce an output, that is observable by each of the first plurality of occupants and each of the second plurality of occupants at the first plurality of seats 101 and the second plurality of seats 102, respectively, based on the comparison of the interpreted emotional state of each of the first plurality of occupants with the emotional state of each of the second plurality of occupants that is performed by the second processing unit 122.

The output device 131 may include at least one of a display panel, one or more colored lights, one or more diode lasers, a public address system, a speaker system, one or more haptic output devices, a smoke generator, a firework activation system, etc.

According to an exemplary embodiment of the inventive concept, the output device 131 may include an output unit disposed within each of the first plurality of seats 101 disposed within the first section of the venue and each of the second plurality of seats 102 disposed within the second section of the venue. According to an exemplary embodiment of the inventive concept, the output device 131 may include an output disposed within each of the first plurality of seats 101 and/or each of the second plurality of seats 102, e.g., haptic output devices, as well as disposed away from each of the first plurality of seats 101 and/or the second plurality of seats 102, e.g., strobe lights. In other words, configurations of the output device 131 with respect to the first plurality of seats 101 and the second plurality of seats 102 may vary.

According to an exemplary embodiment of the inventive concept, the first output device 131 may be disposed within a plurality of wearable computers worn by the first plurality of occupants of the first plurality of seats 101 and the second plurality of occupants of the second plurality of seats. In other words, the first output device 131 may be disposed within the first plurality of wearable computers and the second plurality of wearable computers, described above. The wearable computers may include, for example, a haptic output device that is configured to vibrate.

For example, a display panel may display messages to encourage sad fans to cheer for their team. Colored lights may be color-coded to the interpreted emotional states, e.g., red for anger and blue for happiness. Diode lasers may be configured to activate a laser show for happy fans celebrating a goal or singing along to the chorus of a song. A public address system may initiate a rousing cheer. A speaker system may provide additional accompaniment for a song, gradually intensifying humming for a build-up, deep bass for vibration, etc. Haptic output devices may be included in the seats and/or in wearables to vibrate for anxious fans waiting for a goal, run, touchdown, etc. to be scored. A smoke generator may produce fog according to which attendees are the loudest. A firework activation system may trigger fireworks at key moments in response to crowd excitement. As can be seen, the output device 131 may have multiple configurations and the above are merely examples. Several more detailed examples will be described below.

As a first example, when the home team is building up towards a goal and everyone is getting excited, all of the seats and/or wearables may start to vibrate through haptic output devices, the sections of the venue may start to hum through the speaker system, etc. Additionally, the output device 131 may be configured with more particularity. For instance, if a majority of occupants in the first plurality of seats is wearing uniforms of the away team, colored lights may show red and a display panel may encourage them to boo.

As a second example, in a rock concert, a speaker system/haptic output devices may generate humming/vibrating that gradually intensifies as a build-up to a particular song. Furthermore, lighting via colored lights, diode lasers, strobe lights, etc. throughout the venue may reflect how much the audience is singing or clapping along and/or to encourage them to do so. For example, in coordination with a public address system, different sections may be encouraged to clap or cheer and the lighting may be brighter or more intense for louder sections.

As a third example, configuration of the colored lights may be more sophisticated. In addition to color-coding according to emotional state, e.g., red for anger and blue for happiness, the colors may be associated with which fans are sitting in which sections. For example, computer vision interpretation may determine what team the majority of occupants in a section support, through the uniforms they are wearing, banners they are holding, etc. Or more simply, it may be assumed that sections for season ticket holders support the home team. The colored lights may flash in accordance with the team's colors.

Thus, according to exemplary embodiments of the inventive concept, an interactive seating system includes a plurality of sensors devices distributed throughout a venue for observing occupants in a plurality of seats divided into different sections. Through image recognition and other processing, processing units may analyze audience behavior and reactions in response to a live event and output units in the venue may reflect and augment the emotional state of the audience to create a more immersive experience.

Figure 2:
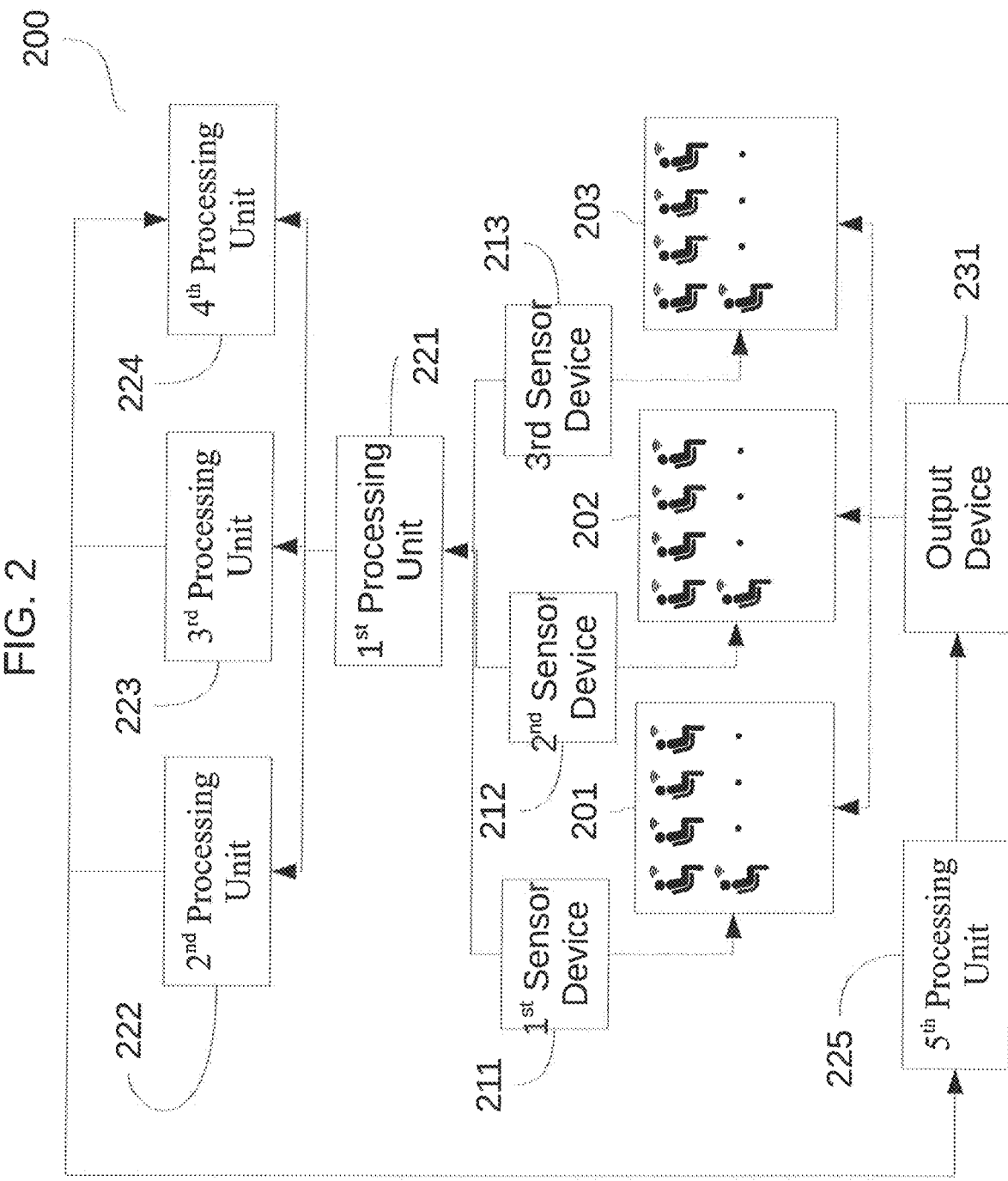
FIG. 2 illustrates an interactive seating system including at least three sections of seating according to an exemplary embodiment of the inventive concept.

FIG. 2 illustrates an interactive seating system including at least three sections of seating according to an exemplary embodiment of the inventive concept.

An interactive seating system 200 may include a first plurality of seats 201, a first sensor device 211, a second plurality of seats 202, a second sensor device 212, a third plurality of seats 203, a third sensor device 213, a first processing unit 221, a second processing unit 222, a third processing unit 223, a fourth processing unit 224, a fifth processing unit 225, and an output device 231.

The first plurality of seats 201, the first sensor device 211, the second plurality of seats 202, and the second sensor device 212 may be similar to the first plurality of seats 101, the first sensor device 111, the second plurality of seats 102, and the second sensor device 112, respectively, of FIG. 1. Additionally, the third plurality of seats 203 may be similar to the first and second plurality of seats 101 and 102, and the third sensor device 213 may be similar to the first and second sensor devices 111 and 112. Thus, repetitive descriptions may be omitted.

The first plurality of seats 201 may be disposed within the first section of the venue. The second plurality of seats 202 may be disposed within the second section of the venue. The third plurality of seats 203 may be disposed within a third section of the venue. The first, second, and third sections of the venue may be non-overlapping. In other words, the first through third sections may be distinct sections of the venue.

The first sensor device 211 may be directed towards the first section and configured to observe each of the first plurality of occupants of the first plurality of seats 201. The second sensor device 212 may be directed towards the second section and configured to observe each of the second plurality of occupants of the second plurality of seats 202. The third sensor device may be directed towards the third section and configured to observe each of a third plurality of occupants of the third plurality of seats 203.

The first processing unit 221 may be configured to receive data from the first sensor device 211, the second sensor device 212, and the third sensor device 213 and to interpret an emotional state of each of the first plurality of occupants, each of the second plurality of occupants, and each of the third plurality of occupants, based on the received data from the first sensor device 211, the second sensor device 212, and the third sensor device 213, respectively. In other words, the first processing unit 221 may be similar to the first processing unit 121 of FIG. 1, and thus repetitive descriptions are omitted.

The second processing unit 222 may be configured to score the emotional state of the first plurality of occupants based on the interpreted emotional state of each of the first plurality of occupants, the interpreted emotional state of each of the second plurality of occupants weighted according to a distance between the first section and the second section, and the interpreted emotional state of the third plurality of occupants weighted according to a distance between the first section and the third section.

For example, a score of an interpreted emotional state may be between 1 and 100, where 100 represents a very happy state, 1 represents a very angry state, and 50 represents a neutral state, e.g., with little motion and change in facial expressions. Accordingly, the score may represent a gradient of emotional states. The second section may be immediately adjacent to the first section whereas the third section may be immediately adjacent to the second section such that the second section is between the first section and the third section. Thus, in this example, the distance between the first section and the second section is 1, and the distance between the first section and the third section is 2. The first plurality of occupants in the first section may have an initial score of 70. The second plurality of occupants in the second section may have an initial score of 60. The third plurality of occupants in the third section may have an initial score of 30. For example, the first section's own score may have 50% weight. The other sections included in the calculation may apportion the remaining 50% weight dependent on their distance from the first section. Thus, the score may be calculated as follows: Score=0.5*70+(0.5*⅔)*60+(0.5*⅓) *30. Because the distance between the third section and the first section is twice the distance between the second section and the first section, the weight of the third section is half the weight of the second section. As such, the score of the emotional state of the first plurality of occupants may be 60. However, the inventive concept is not limited thereto, and weighted scoring may be calculated differently. Accordingly, a more "accurate picture" of the emotional state of the occupants in each section may be obtained in view of the emotional states of occupants in nearby sections. A discordant output by the output devices may thus be avoided.

The third processing unit 223 may be configured to score the emotional state of the second plurality of occupants based on the interpreted emotional state of each of the second plurality of occupants, the interpreted emotional state of each of the first plurality of occupants weighted according to a distance between the second section and the first section, and the interpreted emotional state of the third plurality of occupants weighted according to a distance between the second section and the third section. The third processing unit 223 may score the emotional state of the second plurality of occupants in a manner similar to how the second processing unit 222 scores the emotional state of the first plurality of occupants.

The fourth processing unit 224 may be configured to score the emotional state of the third plurality of occupants based on the interpreted emotional state of each of the third plurality of occupants, the interpreted emotional state of each of the first plurality of occupants weighted according to a distance between the third section and the first section, and the interpreted emotional state of the second plurality of occupants weighted according to a distance between the third section and the second section. The fourth processing unit 224 may score the emotional state of the third plurality of occupants in a manner similar to how the second processing unit 222 scores the emotional state of the first plurality of occupants.

The fifth processing unit 225 may be configured to receive the scored emotional state of the first plurality of occupants, to receive the scored emotional state of the second plurality of occupants, to receive the scored emotional state of the third plurality of occupants, and to compare the scored emotional state of the first plurality of occupants with the scored emotional state of the second plurality of occupants and the scored emotional state of the third plurality of occupants. The fifth processing unit 225 may be similar to the second processing unit 122 of FIG. 1. In other words, the fifth processing unit 225 may determine what to output through the output device 231 in view of the emotional states of the first through third pluralities of occupants.

The output device 231 may be configured to automatically produce an output, that is observable by each of the first plurality of occupants, each of the second plurality of occupants, or each of the third plurality of occupants, based on the comparison of the scored emotional state of the first plurality of occupants with the scored emotional state of the second plurality of occupants and the scored emotional state of the third plurality of occupants. The output device 231 may be similar to the output device 131 of FIG. 1.

Figure 3:
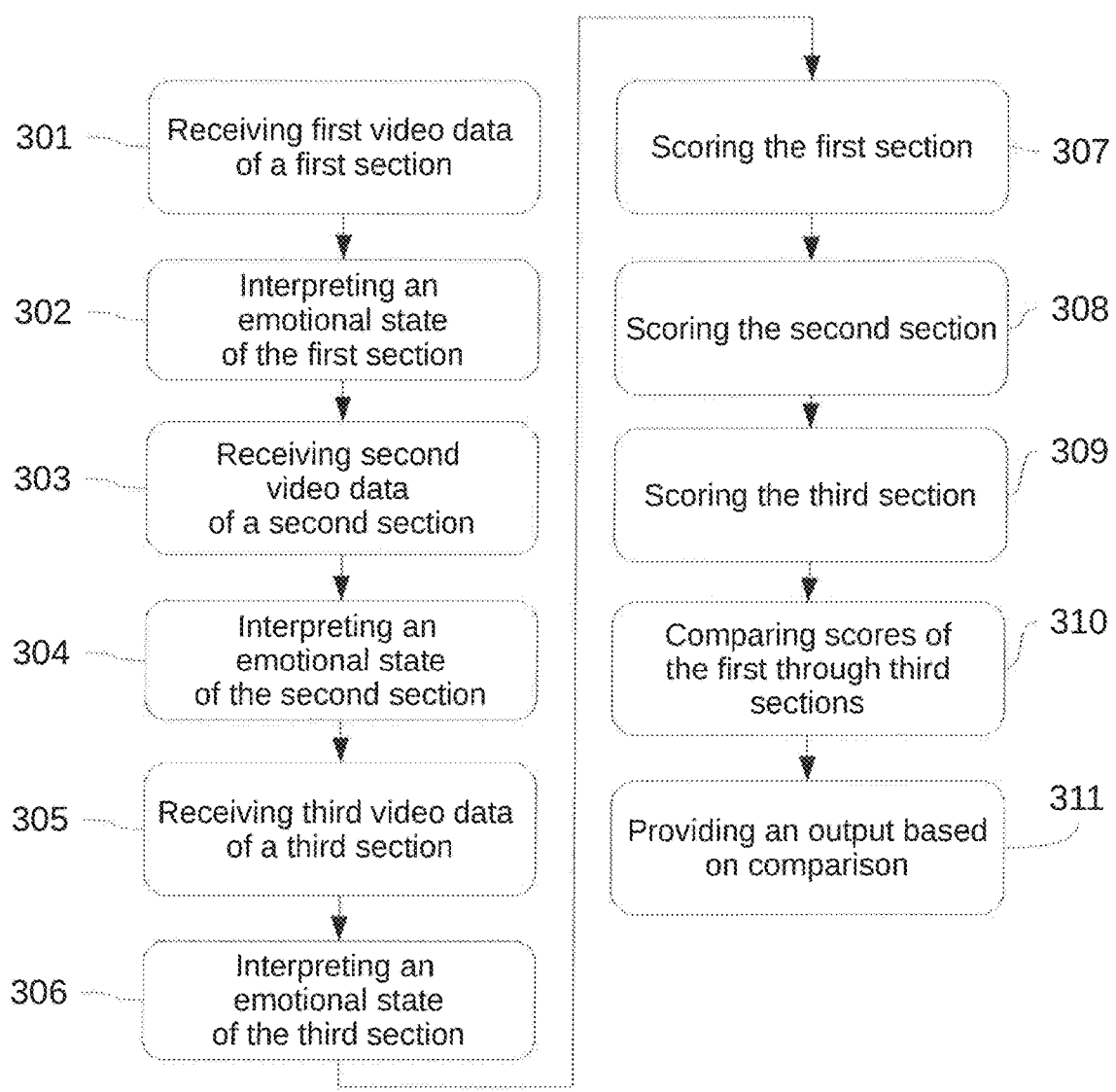
FIG. 3 is a flowchart illustrating a method for interacting with a crowd according to an exemplary embodiment of the inventive concept.

FIG. 3 is a flowchart illustrating a method for interacting with a crowd according to an exemplary embodiment of the inventive concept. Hereinafter, the method of FIG. 3 will be described with respect to the interactive seating system of FIG. 2, but the inventive concept is not limited thereto.

First video data of the first plurality of occupants of the first plurality of seats 201 disposed within the first section of the venue may be received by the first processing unit 221 (operation 301). For example, the first video data may be acquired using a first video camera, included in the first sensor device 211, pointed at the first section.

An emotional state of each of the first plurality of occupants may be interpreted by the first processing unit 221 (operation 302).

Second video data of the second plurality of occupants of the second plurality of seats 202 disposed within the second section of a venue may be received by the first processing unit 221 (operation 303). The second video data may be acquired using a second video camera, included in the second sensor device 212, pointed at the second section.

An emotional state of each of the second plurality of occupants may be interpreted by the first processing unit 221 (operation 304).

Third video data of the third plurality of occupants of the third plurality of seats 203 disposed within the third section of a venue may be received by the first processing unit 221 (operation 305). The third video data may be acquired using a third video camera, included in the third sensor device 213, pointed at the third section.

An emotional state of each of the third plurality of occupants may be interpreted by the first processing unit 221 (operation 306).

According to exemplary embodiments of the inventive concept, pairs of operations 301 and 302, 303 and 304, and 305 and 306 may be performed sequentially, in a different order, or at substantially the same time.

The first section may be scored based on the interpreted emotional state of each of the first plurality of occupants, the interpreted emotional state of each of the second plurality of occupants weighted according to a distance between the first section and the second section, and the interpreted emotional state of each of the third plurality of occupants weighted according to a distance between the first section and the third section (operation 307). Operation 307 may be performed by the second processing unit 222, as described above.

The second section may be scored based on the interpreted emotional state of each of the second plurality of occupants, the interpreted emotional state of each of the first plurality of occupants weighted according to a distance between the second section and the first section, and the interpreted emotional state of each of the third plurality of occupants weighted according to a distance between the second section and the third section (operation 308). Operation 308 may be performed by the third processing unit 223, as described above.

The third section may be scored based on the interpreted emotional state of each of the third plurality of occupants, the interpreted emotional state of each of the first plurality of occupants weighted according to a distance between the third section and the first section, and the interpreted emotional state of each of the second plurality of occupants weighted according to a distance between the second section and the third section (operation 309). Operation 309 may be performed by the fourth processing unit 224, as described above.

The scores of the first section, the second section, and the third section may be compared (operation 310). Operation 310 may be performed by the fifth processing unit 225, as described above.

An output observable to each of the first plurality of occupants, each of the second plurality of occupants, or each of the third plurality of occupants may be provided based on the comparing of the scores of the first section, the second section, and the third section (operation 311).

Operation 311 may be performed by the output unit 231. For example, the output may be provided by at least one of a display panel, one or more colored lights, one or more diode lasers, a public address system, a speaker system, one or more haptic output devices, a smoke generator, etc.

Figure 4:
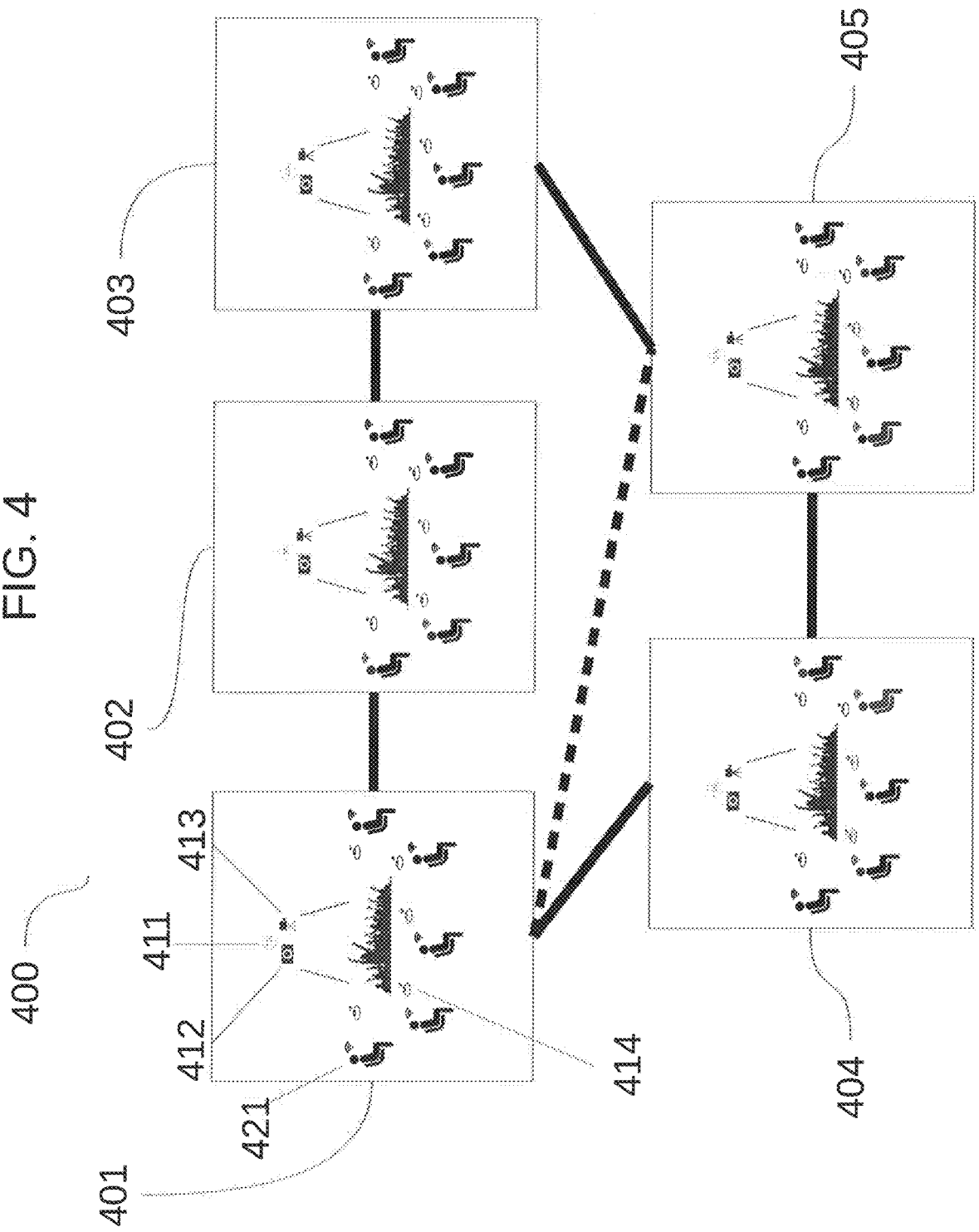
FIG. 4 illustrates an interactive seating system including multiple sections of seating, multiple sensors, and multiple output devices according to an exemplary embodiment of the inventive concept.

FIG. 4 illustrates an interactive seating system including multiple sections of seating, multiple sensors, and multiple output devices according to an exemplary embodiment of the inventive concept.

An interactive seating system 400 may include a first plurality of seats in a first section 401, a second plurality of seats in a second section 402, a third plurality of seats in a third section 403, a fourth plurality of seats in a fourth section 404, and fifth plurality of seats in a fifth section 405. A configuration of the first section 401 may be substantially the same as that of the second through fifth sections 402 to 405. Therefore, only the first section 401 will be described hereinafter.

The first section 401 may include a sensor suite, e.g., a carbon dioxide sensor 411, a visual or photographic camera 412, a video camera 413, and a plurality of wearable computers 414. However, the inventive concept is not limited thereto, and the first section 401 may include other sensor devices in addition to or instead of the above-listed sensor devices. The first plurality of seats may include a first seat 421. The first seat 421 may be substantially the same as the other seats in the first section 401.

As described above, a time based analysis may be performed. The sensor suite may collect data from the occupants in the first section 401 at predetermined intervals. Accordingly, changes in crowd behavior over time may be observed and the interactive seating system 400 may learn the "flow" of the event. Processing units may analyze the data collected by the sensor suite and determine an appropriate response by output devices disposed in the seats and the plurality of wearable computers 414. For example, the first seat 421 may include a haptic output device, a smoke generator, a speaker system, etc.

Sections of the venue may be arranged in a hierarchical manner. Immediately adjacent sections may have "first degree" adjacency, as shown by solid lines. Sections that are not immediately adjacent but are still close may have "second degree" adjacency, as shown by dotted lines (only one is shown in FIG. 4 as an example).

According to an exemplary embodiment of the inventive concept, the sections may transmit data to a processing unit, e.g., the first processing unit 221 of FIG. 2, and an emotional state of each section may be scored based on its own emotional state and emotional states of nearby sections. According to an exemplary embodiment of the inventive concept, the sections may transmit data to one another. For example, as described above, each section may its own processing unit for calculating an emotional state based on its own sensor data as well as sensor data from nearby sections, e.g., with weighting by first or second degree adjacency. Transmission of sensor data may occur at predetermined intervals.

As described above, the plurality of wearable computers 414 may transmit data to a processing unit, e.g., the first processing unit 221 of FIG. 2, through an access point. According to an exemplary embodiment of the inventive concept, the plurality of wearable computers 414 may each have a processing unit for determining an emotional state of its wearer. The plurality of wearable computers 414 may communicate with one another, e.g., through wireless communication, and each may calculate its own score based on data from nearby wearable computers. Accordingly, by communicating with one another, each score is a weighted average, and all the scores for a given section may then be averaged, resulting in a more accurate estimate of the overall emotional state of the section.

According to an exemplary embodiment of the inventive concept, each of the plurality of wearable computers 414 may pair with the seat of its wearer. As such, sensor data from a wearable computer may be combined with sensor data of sensors included in a seat, and the scored emotional state may be determined therefrom by a processing unit in the wearable computer or the seat.

According to an exemplary embodiment of the inventive concept, the interactive seating system 400 includes the sensor suite and output devices but does not include the plurality of wearable computers 414 or seats. For example, a venue without fixed seating may still be configured with video cameras as sensors and speakers/lights/haptics as output devices to respond to crowd behavior. Similarly, according to an exemplary embodiment of the inventive concept, the interactive seating system 400 may not include the plurality of wearable computers 414. As described above, sensor and output functionality may be achieved by devices other than wearable computers.

Figure 5:
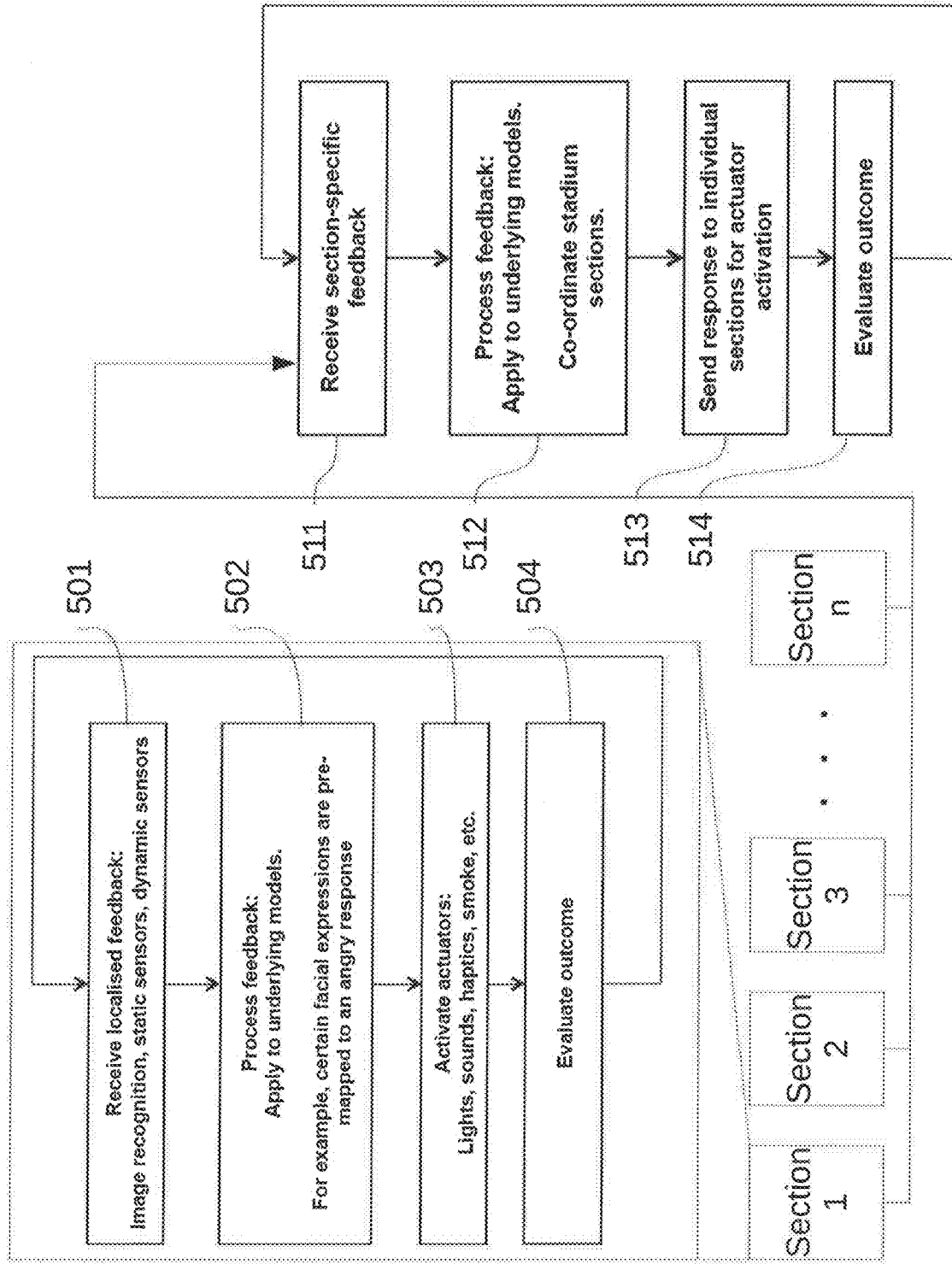
FIG. 5 is a flowchart illustrating a hierarchical method for interacting with a crowd seated in a plurality of sections according to an exemplary embodiment of the inventive concept.

FIG. 5 is a flowchart illustrating a hierarchical method for interacting with a crowd seated in a plurality of sections according to an exemplary embodiment of the inventive concept. As an example, the method of FIG. 5 will be described with reference to the interactive seating systems of FIGS. 2 and 4.

As discussed above, a venue may include a plurality of sections that each include a plurality of seats. Each of the plurality of sections may perform operations 501 to 504, which will be referred to as a feedback mechanism and will be described below.

In operation 501, localized feedback may be received from a plurality of sensors including both static (e.g., venue-based) sensors and dynamic (e.g., person-based) sensors. For example, the static sensors may include the carbon dioxide sensor 411, the photographic camera 412, and the video camera 413, and the dynamic sensors may include the plurality of wearable computers 414. As described above with reference to FIG. 1, image recognition and computer vision interpretation may be performed on data captured by the photographic camera 412 and/or the video camera 413.

In operation 502, the localized feedback may be processed and applied to underlying models, e.g., by the first processing unit 221. For example, certain facial expressions may be pre-mapped to an angry response.

In operation 503, actuators, e.g., the output unit 231, may be activated in response to processing the localized feedback by the second through fifth processing units 222 through 225. For example, lights, sounds, haptics, smoke, etc. may be generated.

In operation 504, the outcome may be evaluated. In other words, after the actuators are activated, occupants may react, e.g., become more excited. Thus, operations 501 through 504 may be performed in a loop. For example, operations 501 through 504 may be performed at predetermined intervals, e.g., once per second. Accordingly, the method may continually adjust and produce output in response to the emotional states of the occupants.

As described, each of the plurality of sections, e.g., Section 1 through Section n, may have its own feedback mechanism, e.g., operations 501 through 504. A "global" method, as will be described with reference to operations 511 through 514, may coordinate venue-wide interaction between different sections.

In operation 511, section-specific feedback may be received. For example, local feedback received in operation 501 for each of the plurality of sections may be received.

In operation 512, the feedback may be processed and applied to underlying models, e.g., as performed by the fifth processing unit 225. The different sections may be coordinated, and in operation 513, a response may be sent to each of the plurality of sections for actuator activation. For example, red light may be displayed in the first section 401, second section 402, and the third section 403, blue light may be displayed in the fourth section 404 and the fifth section 405, and the colors may alternate at predetermined intervals for a coordinated light display.

In operation 514, the outcome may be evaluated. In other words, a venue-wide crowd response may be evaluated through the different sensors. Thus, operations 511 through 514 may be performed in a loop. For example, operations 511 through 514 may be performed at predetermined intervals, e.g., once every ten seconds.

Figure 6:
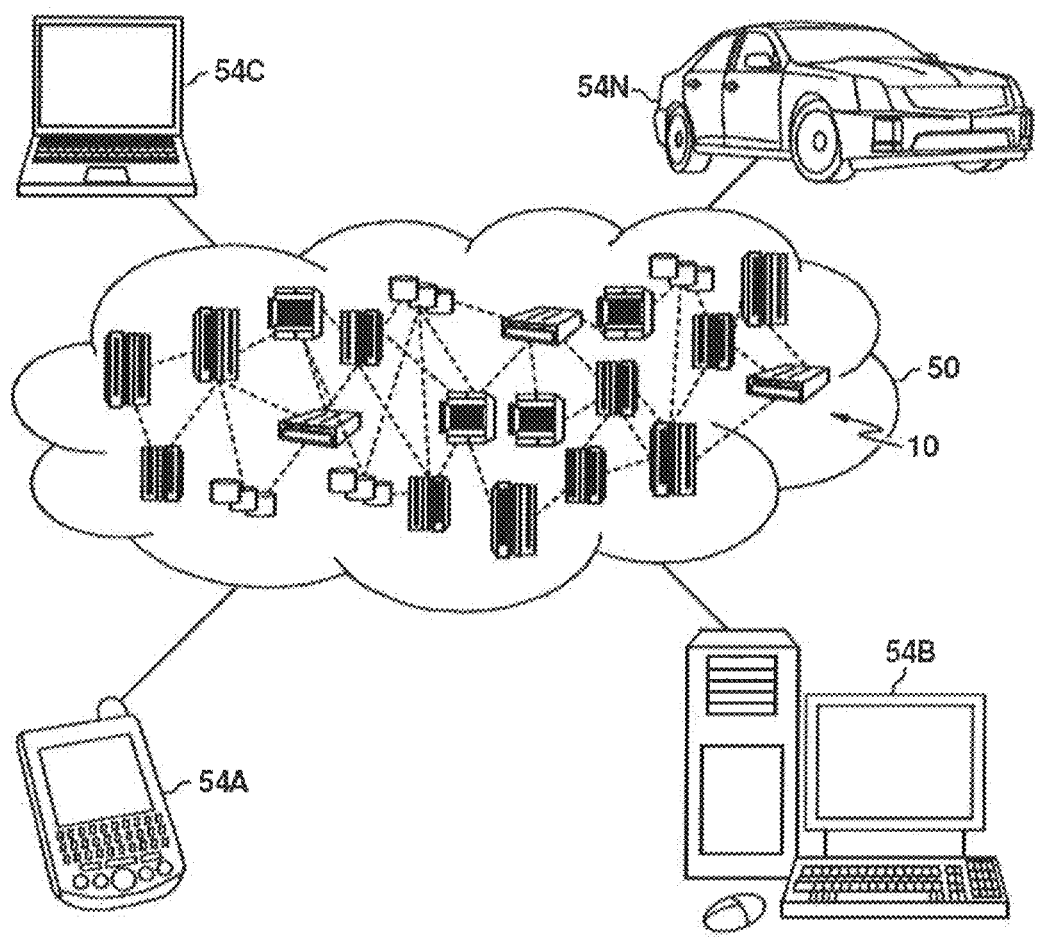
FIG. 6 depicts a cloud computing environment according to an exemplary embodiment of the inventive concept.
Figure 7:
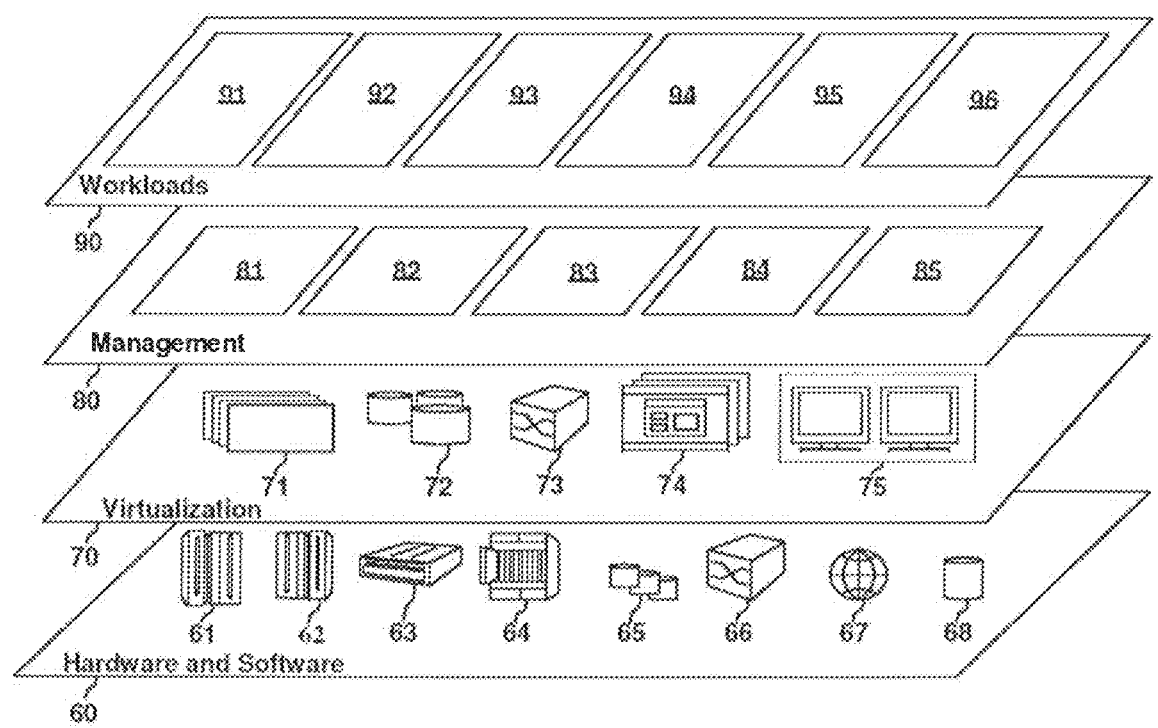
FIG. 7 depicts abstraction model layers according to an exemplary embodiment of the inventive concept.

FIG. 6 depicts a cloud computing environment according to an exemplary embodiment of the inventive concept. FIG. 7 depicts abstraction model layers according to an exemplary embodiment of the inventive concept.

It is understood in advance that although this disclosure includes a detailed description on cloud computing, implementation of the teachings recited herein are not limited to a cloud computing environment. Rather, embodiments of the inventive concept are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop 96.

Figure 8:
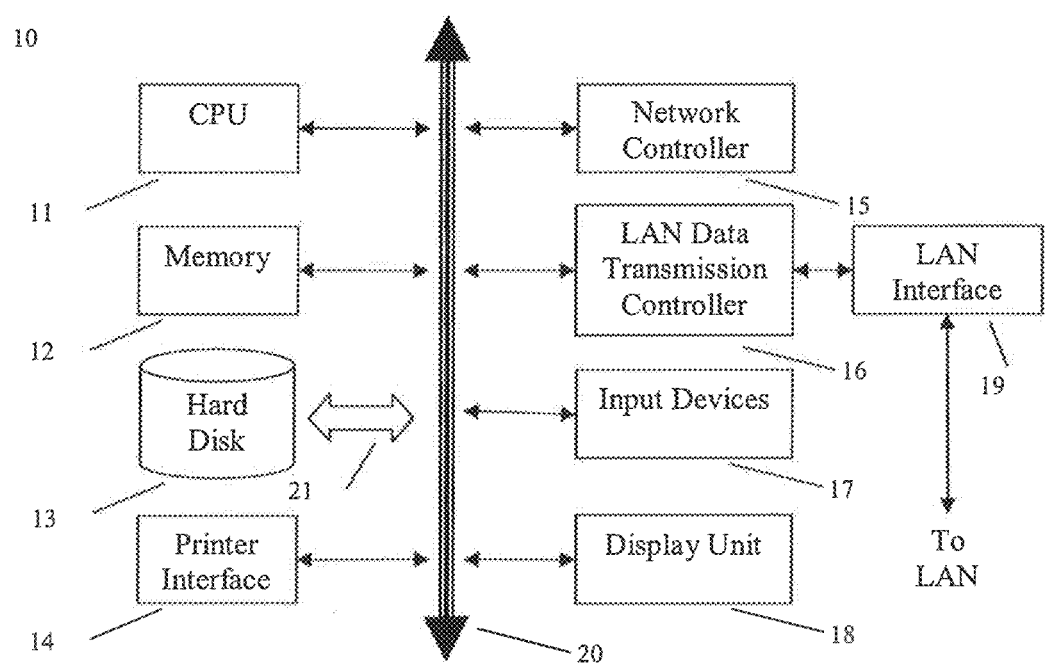
FIG. 8 illustrates an example of a computer system capable of implementing the methods according to an exemplary embodiment of the inventive concept.

FIG. 8 illustrates an example of a computer system capable of implementing the methods according to exemplary embodiments of the inventive concept. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 10 may include, for example, a central processing unit (CPU) 11, random access memory (RAM) 12, a printer interface 14, a network controller 15, a local area network (LAN) data transmission controller 16, a display unit 18, a LAN interface 19, an internal bus 20, and one or more input devices 17, for example, a keyboard, mouse etc. As shown, the system 10 may be connected to a data storage device, for example, a hard disk, 13 via a link 21.

Moreover, the inventive concept may be a system, a method, and/or a computer program product at any possible technical detail level of integration. The computer program product may include a computer readable storage medium (or media) having computer readable program instructions thereon for causing a processor to carry out aspects of the inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the inventive concept.

Aspects of the inventive concept are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to an exemplary embodiment of the inventive concept, with respect to the systems and methods described above with reference to FIGS. 1 to 5, they may be configured across the plurality of layers of FIG. 7 within the cloud computing environment 50 of FIG. 6. For example, the first and second sensor devices 111 and 112 and the output device 131 of FIG. 1 may be configured at the hardware and software layer 60. The first and second processing units 121 and 122 may be configured at any of the hardware and software layer 60, the virtualization layer 70, the management layer 80, or the workloads layer 90.

According to an exemplary embodiment of the inventive concept, the system 10 of FIG. 8 may correspond to the interactive seating system 100/200/400 described above with reference to FIGS. 1, 2, and 4 and/or be configured to perform the operations described above with reference to FIGS. 3 and 5. For example, the RAM 12 or hard disk 13 may be store the computer program configured to perform the above-described processing/interpretation/comparison/scoring, and the CPU 11 may execute the computer program. The network controller 15 may enable communication between the different components, e.g., to receive data from the first sensor device 111 and the second sensor device 112 and to output a control signal to the output device 131.

According to an exemplary embodiment of inventive concept, blocks of the flowcharts illustrated in FIGS. 3 and 5 may be implemented by computer readable program instructions.

As described above, according to exemplary embodiments of the inventive concept, an interactive seating system and a method for interacting with a crowd are provided. Crowd behavior may be learned over time using a plurality of sensors, and crowd response and engagement may be improved through a plurality of output devices providing different output in response to emotional states of attendees in different sections. Moreover, the plurality of output devices may be used for emergencies, e.g., for evacuations, and learned crowd behavior may be used for improved spectator signage and improved design of other venues.

While the inventive concept has been shown and described with reference to exemplary embodiments thereof, it will be understood by those of ordinary skill in the art that various changes in form and detail may be made therein without departing from the spirit and scope of the inventive concept as set forth by the following claims.

We claim:

1. An interactive seating system, comprising:
a first plurality of seats disposed within a first section of a venue;
a first sensor device directed towards the first section and configured to observe each of the first plurality of seats;
a second plurality of seats disposed within a second section of the venue;
a second sensor device directed towards the second section and configured to observe each of the second plurality of seats;
a first processing circuit configured to receive data from the first sensor device and the second sensor device and to interpret an emotional state of each of a first plurality of occupants of the first plurality of seats and each of a second plurality of occupants of the second plurality of seats based on the received data from the first sensor device and the second sensor device, respectively;
a second processing circuit configured to receive the interpreted emotional state of each of the first plurality of occupants, to receive the interpreted emotional state of each of the second plurality of occupants, and to compare the interpreted emotional state of each of the first plurality of occupants with the interpreted emotional state of each of the second plurality of occupants; and
an output device configured to automatically produce an output, that is observable at the venue by each of the first plurality of occupants and each of the second plurality of occupants, based on the comparison of the interpreted emotional state of each of the first plurality of occupants with the interpreted emotional state of each of the second plurality of occupants,
wherein the first processing circuit and the second processing circuit are computer systems,
wherein the output device includes an output unit disposed within each of the first plurality of seats disposed within the first section of the venue and each of the second plurality of seats disposed within the second section of the venue, and
an output of the output unit disposed within each of the first plurality of seats disposed within the first section of the venue is different from an output of the output unit disposed within each of the second plurality of seats disposed within the second section of the venue based on the comparison of the interpreted emotional state of each of the first plurality of occupants with the interpreted emotional state of each of the second plurality of occupants.

2. The system of claim 1, wherein the venue is a stadium, arena or theatre.

3. The system of claim 1, wherein the first sensor device includes a first video camera pointed towards the first section and the second sensor device includes a second video camera pointed towards the second section.

4. The system of claim 1, wherein the first sensor device includes a plurality of first sensors including a first video camera, a first infrared camera, a first 3D camera, a first depth-sending camera, a first laser range finder, a first carbon dioxide sensor, a first temperature sensor, or a first microphone, and the second sensor device includes a plurality of second sensors including a second video camera, a second infrared camera, a second 3D camera, a second depth-sensing camera, a second laser range finder, a second carbon dioxide sensor, a second temperature sensor, or a second microphone.

5. The system of claim 1, wherein the first processing circuit is a computer system running software for computer vision interpretation in which one or more faces are recognized within of each of the first plurality of occupants of the first plurality of seats and each of the second plurality of occupants of the second plurality of seats and each of the one or more faces is indexed to an atlas of facial expressions that is correlated to known emotional states.

6. The system of claim 1, wherein the first processing circuit is a computer system running software for computer vision interpretation in which the data from the first sensor device and the data from second sensor device are interpreted using a trained classifier that has been trained using video data that has been annotated for emotional states.

7. The system of claim 1, wherein the first processing circuit is a computer system running software for performing computer vision and 3D modeling interpretation of personal dynamics of the data from the first sensor device and the data from second sensor device.

8. The system of claim 1, wherein the output device includes a display panel, one or more colored lights, one or more diode lasers, a public address system, a speaker system, one or more haptic output devices, a smoke generator, or a firework activation system.

9. The system of claim 1, wherein the first sensor device includes a first sensor disposed within each of the first plurality of seats disposed within the first section of the venue and the second sensor device includes a second sensor disposed within each of the second plurality of seats disposed within the second section of the venue.

10. The system of claim 9, wherein the first sensor device includes a first pressure sensor, a first temperature sensor, a first carbon dioxide sensor, or a first microphone, disposed within each of the plurality of seats disposed within the first section of the venue and the second sensor device includes a second pressure sensor, a second temperature sensor, a second carbon dioxide sensor, or a second microphone, disposed within each of the plurality of seats disposed within the second section of the venue.

11. The system of claim 1, wherein the second processing circuit is configured to additionally compare degree of activity, degree of change in emotional state, or degree of change in activity.

12. The system of claim 1, wherein the first sensor device is disposed within a first plurality of wearable computers worn by the first plurality of occupants of the first plurality of seats and the second sensor device is disposed within a second plurality of wearable computers worn by the second plurality of occupants of the second plurality of seats.

13. The system of claim 1, wherein the output device is disposed within a plurality of wearable computers worn by the first plurality of occupants of the first plurality of seats and the second plurality of occupants of the second plurality of seats.

* * * * *